United States Patent [19]

Petitjean et al.

[11] Patent Number: 4,538,148
[45] Date of Patent: Aug. 27, 1985

[54] COHERENT RADAR

[75] Inventors: Christian Petitjean; Maurice Marchand, both of Boulogne Billancourt, France

[73] Assignee: LMT Radio Professionnelle, Boulogne Billancourt, France

[21] Appl. No.: 306,342

[22] Filed: Sep. 28, 1981

[30] Foreign Application Priority Data

Oct. 3, 1980 [FR] France ................................ 80 21225

[51] Int. Cl.³ .......................... G01S 7/36; G01S 13/34
[52] U.S. Cl. .............................. 343/17.2 R; 343/18 E
[58] Field of Search ........... 343/5 EM, 5 TM, 5 HM, 343/17.5, 17.2 R, 18 E, 5 R, 17.1 R

[56] References Cited

U.S. PATENT DOCUMENTS

| | | | |
|---|---|---|---|
| 3,121,868 | 2/1964 | Hausz et al. | 343/17.1 R |
| 3,163,862 | 12/1964 | Jenny | 343/17.2 R X |
| 3,713,153 | 1/1973 | van Popta | 343/18 E |
| 3,725,917 | 4/1973 | Sletten et al. | 343/17.2 R X |
| 4,142,189 | 2/1979 | Gleason | 343/17.2 PC X |
| 4,271,412 | 6/1981 | Glass et al. | 343/14 |
| 4,342,998 | 8/1982 | Easter | 343/17.1 R |
| 4,379,295 | 4/1983 | Lewis et al. | 343/17.2 PC |

OTHER PUBLICATIONS

Gary Blake Jordan, "Comparison of Two Major Classes of Coherent Pulsed Radar Systems", May 1975, vol.-AES-11, No. 3, pp. 363-371, (IEE Transactions on Aerospace and Electronic Systems).

Primary Examiner—Sal Cangialosi
Assistant Examiner—Gilberto Barrón, Jr.
Attorney, Agent, or Firm—Cushman, Darby and Cushman

[57] ABSTRACT

A coherent radar including separate transmitting and receiving chains. The transmitting chain includes a master oscillator providing a signal at frequency F0. A multiplier multiplies F0 by a predetermined amount to produce a signal at a frequency F1. A second multiplier multiplies the signal at frequency F1 to produce a signal at frequency F2, F1 and F2 being coherent with F0. A first mixer mixes F1 with F0 and a second mixer mixes F2 with the product of the first mixer to produce a transmission signal. In the receiving chain, a received signal is amplified and filtered and then mixed in a third mixer with the second signal at frequency F2 from the transmitting chain. The mixing product of the third mixer is amplified and filtered and mixed in a fourth mixer with the first signal. The fourth mixer product is then coupled to a processor for producing a radar display.

5 Claims, 1 Drawing Figure

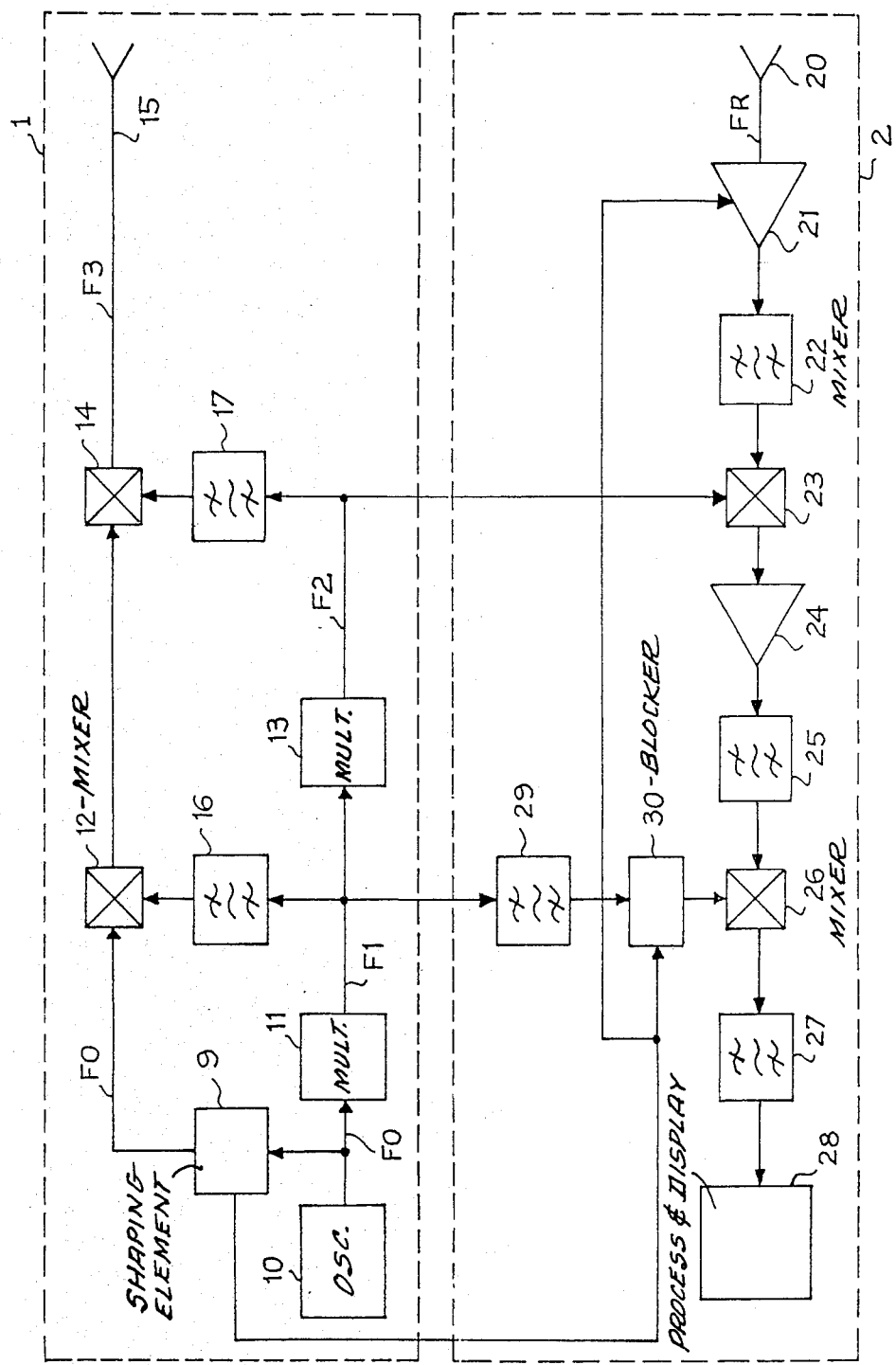

COHERENT RADAR

This invention relates to a coherent radar.

A coherent radar receiver of the type at present in operation essentially makes use of a receiving antenna which collects the received signal having a frequency FR, a local oscillator having a frequency FL and a mixer in which the received signal is transposed to a lower frequency by mixing with the signal delivered by the local oscillator. The local oscillator which generates the transposition frequency is usually the "slave" of a power oscillator such as a klystron or a magnetron, for example. Dependence is usually achieved by means of an automatic frequency control (AFC). The output of the mixer delivers a signal at the intermediate frequency IF which is filtered and then processed by detection and visual display means.

Receivers of this type are highly exposed in a hostile electronic environment by reason of the jamming produced both by enemy jammers and by other radars employed in the same zone of action. In fact, in the case of a given frequency of the local oscillator, the receiver may be jammed at the operating frequency FR but also at the frequency of the image sideband as well as at all the harmonic beats of the intermediate frequency, that is to say the frequencies $FR+(k-1)\times(FY)$, where k is a relative whole number, $|k|$ (absolute value of k) which indicates the order of the harmonic component. It should be noted, however, that jamming effectiveness decreases when the order of the harmonic component increases.

The present invention provides a receiving chain in which protection against jamming is considerably improved by means which can readily be constructed and do not present any particular technological difficulties.

Furthermore, the invention makes it possible to increase the minimum detectable sensitivity, to remove internal parasites and to prevent deterioration of reception in the instants which follow transmission.

According to one feature of the invention, the coherent radar comprises; means for generating a first signal at a fixed frequency F1 and a second signal at a variable frequency F2, said first and second signals being coherent with one another; a first bandpass filter for filtering the first signal; a second bandpass filter for filtering the second signal; first means for mixing the first and second signals as filtered by said first and second filters, respectively and providing a transmission signal at a variable frequency $F3=F2+F1$; a transmission for radiating the transmission signal; a receiving antenna for receiving a reception signal having a frequency FR; a third bandpass filter for filtering the reception signal; first transposition means for mixing the reception signal filtered by the third filter with the second signal and delivering a third signal having a frequency $FR-F2$; a first preamplifier for amplifying the third signal; a fourth bandpass filter for filtering the third signal amplified by the first preamplifier; a fifth bandpass filter for filtering the first signal; second transposition means for mixing the third signal filtered by the fourth filter with the first signal filtered by the fifth filter and for delivering a fourth signal having a frequency $FR-F1-F2$; a sixth filter for filtering the fourth signal; and processing and display means for utilizing the fourth signal to provide a radar indication.

In accordance with one distinctive feature of the invention, the receiving chain is provided between the receiving antenna and the first filtering means with a low-noise preamplifier which reduces insertion losses caused by the first filtering means to negligible values.

In accordance with another distinctive feature of the invention, the receiving chain comprises first blocking means connected between the first frequency multiplier and the fourth mixer and second blocking means associated with the second preamplifier, the control inputs of the blocking means being connected to one output of the oscillator for delivering a synchronization signal which initiates blocking only if transmission takes place.

These and other features of the invention will be more apparent upon consideration of the following description and accompanying drawings in which the single FIGURE illustrates one example of a coherent Doppler radar in accordance with the invention.

This radar system comprises a transmission chain 1 and a receiving chain 2.

The transmission chain 1 comprises a very stable oscillator 10 which delivers a signal having a frequency F0. The output of oscillator 10 is connected to the input of a shaping element 9 constituted by modulating means, means for coding and/or spectrum spreading according to the type of transmission chosen. The output of oscillator 10 is also connected to the input of a frequency-multiplier circuit 11 having a ratio N1, the output of which produces a signal having a frequency F1. The output of the element 9 is connected to one of the inputs of a mixer 12; the other input of the mixer 12 is connected to the output of the multiplier 11 through a bandpass filter 16.

The output of the multiplier circuit 11 is also connected to the input of a frequency-multiplier circuit 13 having a variable ratio N2, the output of which produces a signal having a frequency F2.

The output of the multiplier circuit 13 is connected to one of the inputs of a mixer 14 through a bandpass filter 17, the other input of which is connected to the output of the mixer 12 which produces a signal having a frequency $F0+F1$.

The output of the mixer 14 is connected to a transmission antenna 15 to which it supplies a signal having a frequency F3 equal to $F0+F1+F2$.

The mixer 12 is so designed as to allow parasitic lines having a frequency $F0+kF1$ to pass through the input which is connected to the output of the multiplier 11. In order to protect the radar against this internal parasite, the bandpass filter 16 is centered on the frequency F1 and is made as narrow as possible.

For the same reasons, bandpass filter 17 is centered on the frequency F2.

The transmission frequency F3 is generated by mixing signals which are all produced from the reference signal F0 derived from the oscillator 10, with the result that the signals having the frequencies F1, F2 and F3 are coherent. The transmission signal having the frequency F3 varies over a broad frequency band having a width $\Delta$ which depends on the variation in the ratio N2 of the circuit 13.

In a particular example of construction, we have:
F0 = 60 MHz,
$F1=N1\times F0=1800$ MHz, $F0+F1=1860$ MHz,
$F2=N2\times F1$, F2 varies from 7440 MHz to 8040 MHz,
$F3=F0+F1+F2$, F3 varies from 9300 MHz to 9900 MHz and $\Delta$ is equal to 600 MHz.

The receiving chain 2 comprises a receiving antenna 20 which receives a signal having a frequency FR within the range of 9300 MHz to 9900 MHz.

The antenna 20 is connected to the input of a low-noise preamplifier 21 having a gain A1, the output of which is connected to first bandpass filtering means constituted by a bandpass filter 22 having a bandwidth Δ which corresponds to the transmitted frequency band, that is, 9300 MHz to 9900 MHz in the example indicated in the foregoing.

The function of the amplifier 21 is to reduce the insertion losses of the filter 22 to negligible values in the contribution of this latter to the total noise factor. In the particular example, the gain A1 of the amplifier 21 must be sufficiently high, namely of the order of 20 dB.

The receiving chain 2 comprises first transposition means constituted by a mixer 23, one of the inputs of which is connected to the output of the multiplier circuit 13 which delivers the signal having a frequency F2. A first transposition is thus achieved and the mixer 23 delivers at its output a signal having the frequency FR−F2.

The receiving chain 2 comprises a second preamplifier 24 having a gain A2, the input of which is connected to the output of the mixer 23 and the output of which is connected to second bandpass filtering means constituted by a bandpass filter 25 having a bandwidth δ and centered on the frequency F0+F1. In the example, F0+F1 is equal to 1860 MHz and δ is chosen so as to be equal to 40 MHz, this value being the maximum permissible value for rejecting the image of a beat at plus or minus 60 MHz.

The function of the amplifier 24 with respect to the filter 25 is identical to the function of the amplifier 21 with respect to the filter 22.

The receiving chain 2 is provided with second transposition means constituted by a mixer 26, one of the inputs of which is connected to the output of the filter 25 and the other input of which is connected via a bandpass filter 29 to the output of the multiplier circuit 11 which delivers the signal having a frequency F1. A second transposition is thus achieved and the mixer 26 delivers at the output a signal having a frequency FR−F2−F1. The bandpass filter 29 is centered on the frequency F1 and serves to remove any remaining parasite residue and more particularly in the case of the frequency F0+F1.

The receiving chain comprises third bandpass filtering means constituted by a bandpass filter 27 having a bandwidth d and centered on the frequency F0, the input of which is connected to the output of the mixer 26 and the output of which is connected to means 28 for processing and displaying information in the signal derived from the mixer 26. Said means are known per se and make it possible, for example, to display the radar image on an indicator of the PPI type. In the particular example, F0 has a value of 60 MHz and d has a value of 4 MHz.

Finally, the receiving chain comprises first blocking means 30 constituted, for example, by a pin-diode attenuator and placed between the bandpass filter 29 and the mixer 26, and second blocking means associated with the preamplifier 21. These blocking means are controlled by the same synchronization signal derived from the element 9 so as to ensure that blocking of the receiving chain takes place at the input at 21 and at 30 each time the transmission chain transmits a single pulse or a sequence and that blocking is discontinued while maintaining full effectiveness and sensitivity of the receiver as soon as the transmission has ceased.

By virtue of this receiving chain with double transposition and triple filtering in succession, the useful frequency F0 is free from parasitic frequencies. In fact, the frequency of any jammer can be effective only at the useful receiving frequency and within the narrowest frequency band of the filter, that is to say in our particular case, the 60-MHz filter having a bandwidth of 4 MHz.

The ratio $R \left( R = \frac{BE}{BB} = \frac{\text{band of utilized frequencies}}{\text{band of frequencies liable to be jammed}} \right)$ is in this case equal to Δ/d. In our example, R=600/4=150, which corresponds to a protection of approximately 22 dB.

Apart from protection against jammers, the double transposition employed in this receiving chain makes it possible to increase the sensitivity of the receiver or in other words to increase the value of the detectable minimum by approximately 3 dB.

Furthermore, by virtue of the effective filtering performed by the filters 16, 17 and 29, no internal parasite need be expected.

Finally, the sensitivity of the receiver is improved in regard to the near zones as a result of blocking of the receiving chain during the transmission periods, thereby preventing impaired sensitivity of the receiver during the instants which follow a transmission.

What is claimed is:
1. A coherent radar comprising:
a single master oscillator generating a master signal at a fixed frequency F0;
means, coupled to said master oscillator, for generating a first signal at a fixed frequency F1 and a second signal at a variable frequency F2, said first and second signals each being coherent with said master signal;
a first bandpass filter for filtering the first signal;
a second bandpass filter for filtering the second signal;
first means for mixing the first signal as filtered with said master signal to provide a first mixer signal coherent with said master signal;
second means for mixing the second signal as filtered with said first mixer signal to produce a transmission signal coherent with said master signal;
a transmission antenna for radiating the transmission signal;
a receiving antenna for receiving a reception signal having a frequency component FR;
a third bandpass filter for filtering the reception signal;
third means for mixing the reception signal filtered by the third filter with the second signal and providing a third mixer signal having a frequency component FR−F2;
an amplifier for amplifying the third mixer signal;
a fourth bandpass filter for filtering the third mixer signal amplified by the first preamplifier;
a fifth bandpass filter for filtering the first signal;
fourth means for mixing the third mixer signal filtered by the fourth filter with the first signal filtered by the fifth filter and for delivering a fourth mixer signal having a frequency component FR−F1−F2;
a sixth filter for filtering the fourth mixer signal; and processing and display means for utilizing the fourth mixer signal to provide a radar indication.

2. A radar as claimed in claim 1, wherein the generating means comprise:
 a first multiplier having a constant ratio for multiplying the master signal to produce the first signal; and
 a second multiplier having a variable ratio for multiplying the first signal to provide the second signal.

3. A radar as claimed in claim 2 further comprising;
 means for shaping the master signal to provide a shaped master signal;
 the first mixing means mixing the the shaped master signal with the first signal filtered by the first filter.

4. A radar as claimed in claim 3 further comprising:
 a second amplifier connected between the receiving antenna and the third bandpass filter for compensating for the attenuation produced by said third filter.

5. A radar as claimed in claim 4 further comprising:
 first blocking means connected between the fifth bandpass filter and the fourth mixing means, and wherein the second amplifier comprises second blocking means incorporated therein for blocking said second amplifier; said first and second blocking means being adapted to receive a signal for controlling the shaping means in order to block reception at the moment of transmission.

* * * * *